(12) United States Patent
Fukunaga

(10) Patent No.: US 11,909,276 B2
(45) Date of Patent: Feb. 20, 2024

(54) ELECTRIC MOTOR WITH COVER PLATE HAVING INSERTION HOLES

(71) Applicant: Nidec Corporation, Kyoto (JP)

(72) Inventor: Keisuke Fukunaga, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 402 days.

(21) Appl. No.: 16/989,975

(22) Filed: Aug. 11, 2020

(65) Prior Publication Data

US 2020/0373820 A1 Nov. 26, 2020

Related U.S. Application Data

(63) Continuation of application No. 15/767,416, filed as application No. PCT/JP2016/080525 on Oct. 14, 2016, now Pat. No. 10,855,148.

(30) Foreign Application Priority Data

Oct. 14, 2015 (DE) .......................... 102015013337.3

(51) Int. Cl.
*H02K 11/40* (2016.01)
*H02K 11/33* (2016.01)
(Continued)

(52) U.S. Cl.
CPC ................ *H02K 11/40* (2016.01); *H02K 5/15* (2013.01); *H02K 5/161* (2013.01); *H02K 5/225* (2013.01); *H02K 11/33* (2016.01)

(58) Field of Classification Search
CPC .......... H02K 11/40; H02K 5/15; H02K 5/161; H02K 5/225; H02K 11/33; H02K 5/04;
(Continued)

(56) References Cited

U.S. PATENT DOCUMENTS 6,702,592 B1 * 3/2004 Harden .................. H05K 3/325
439/948
10,855,148 B2 * 12/2020 Fukunaga .............. H02K 5/225
(Continued)

FOREIGN PATENT DOCUMENTS

JP       08-317604 A    11/1996
JP       2009-201277 A   9/2009
JP       2015-089298 A   5/2015

OTHER PUBLICATIONS

Yoshizawa (JP 2011087449 A), Machine translation from JP patent office. printed on Dec. 21, 2019.*
(Continued)

*Primary Examiner* — John K Kim
(74) *Attorney, Agent, or Firm* — Keating & Bennett, LLP

(57) ABSTRACT

An electric motor includes a rotor assembly rotatable about a vertical center axis, a stator assembly around the rotor assembly, a housing inside of which the stator assembly is fixed, and a bearing mechanism rotatably supporting the rotor assembly. The housing includes a cylindrical wall portion inside of which the stator assembly is located, a bottom at a bottom vertical end of the cylindrical wall portion and extending radially outward, and a cover plate on one side of the stator assembly opposite to the bottom. The cover plate includes electrically conductive elements and at least one columnar projection protruding away from the stator assembly so that the at least one projection contacts at least one grounding contact of a controller on one side of the cover plate, the controller being electrically connected to a ground potential through the housing.

13 Claims, 5 Drawing Sheets

(51) Int. Cl.
  *H02K 5/22*    (2006.01)
  *H02K 5/16*    (2006.01)
  *H02K 5/15*    (2006.01)

(58) Field of Classification Search
  CPC ............... H02K 5/1732; H02K 11/30; G05B 2219/25067; G05B 2219/2642; G05B 2219/33125; G05B 15/02; G05B 19/04; G05B 19/0426
  USPC .......................................................... 310/71
  See application file for complete search history.

(56)    References Cited

U.S. PATENT DOCUMENTS

2013/0099609  A1*  4/2013   Ikeno ..................... H02K 11/33
                                                    310/68 B
  2015/0180301  A1*  6/2015   Kajiyama .............. H02K 11/40
                                                    310/89
  2015/0214865  A1*  7/2015   Zhao ........................ H02K 5/04
                                                    318/400.42
  2018/0301961  A1* 10/2018   Fukunaga .............. H02K 11/30
  2020/0373820  A1* 11/2020   Fukunaga .............. H02K 11/30

OTHER PUBLICATIONS

Fukunaga, "An Electric Motor Having Grounding Contact of a Controller", U.S. Appl. No. 15/767,416, filed Apr. 11, 2018.

\* cited by examiner

US 11,909,276 B2

ELECTRIC MOTOR WITH COVER PLATE HAVING INSERTION HOLES

BACKGROUND OF THE INVENTION

1. Field of the Invention

The present disclosure relates to an electric motor.

2. Description of the Related Art

In modern automotive systems, electronic control units (ECU) or controllers with embedded software are provided for electronic control of components of motor vehicles such as brakes and steerings etc. For controlling an electric motor, a controller is usually provided with and covered by a controller cover and the controller cover is electrically conductive to a motor housing or other components contacting the controller cover. The controller is therewith connected to a ground potential through the controller cover, the motor housing or the other components contacting the controller cover and then a car body.

However, there are some situations in which a controller cover is not electrically conductive to a motor housing or other components contacting the controller cover. This can be the case when the controller cover is made of or is coated by resin, when there is an adhesive or resin between the motor housing and the controller cover or when the other components contacting the controller cover are covered by resin. In these situations, the controller is not connected to the ground potential, and electronic problems can be caused.

Prior art teaches an alternator for motor vehicle, comprising a stator having a plurality of phases and surrounding a rotor which is fixed with respect to a shaft that is arranged to be rotated by the internal combustion engine of the motor vehicle via a transmission device comprising at least one belt and a drive member such as a pulley fixed with respect to the rotor shaft. Bearings are provided and joined together, so as to constitute a support casing adapted to be mounted a fixed part of the vehicle. Prior art teaches that the bearings are used for earthing the alternator, the bearings or a face plate fixed with respect to the bearings carrying the rectifier bridges. At least two power supply sources are both connected between earth and a power supply line for the electrical elements.

SUMMARY OF THE INVENTION

Preferred embodiments of the present application provide effective earthing methods to controller modules in motors.

An electric motor according to a preferred embodiment of the present invention includes a rotor assembly, which rotates about a vertical center axis extending in a vertical direction, a stator assembly, which is provided around the rotor assembly, a housing inside of which the stator assembly is fixed, and a bearing mechanism, which rotatably supports the rotor assembly relative to the stator assembly. The housing includes a cylindrical wall portion, the stator assembly being located inside of the cylindrical wall portion, a bottom which is provided at a bottom vertical end of the cylindrical wall portion and which extends radially outward, and a cover plate which is on one side of the stator assembly that is opposite to the bottom. The cover plate is fixed to a radially inner side surface of the cylindrical wall portion and covers an opening of the cylindrical wall portion. The bearing mechanism includes at least two bearings, one of the at least two bearings is supported by the cover plate and another one of the at least two bearings is supported by the bottom of the housing. The cover plate includes electrically conductive elements and at least one columnar projection fixed on the cover plate and protruding away from the stator assembly so that the at least one projection directly or indirectly contacts at least one grounding contact of a controller which drives and controls the electric motor on one side of the cover plate, the controller being electrically connected to a ground potential through the housing.

The above and other elements, features, steps, characteristics and advantages of the present disclosure will become more apparent from the following detailed description of the preferred embodiments with reference to the attached drawings.

BRIEF DESCRIPTION OF THE DRAWINGS

FIGS. 8A, 8B, 8C top views of an electric motor with a controller which achieves the flexible positioning of the controller case according to a preferred embodiment of the present invention.

DETAILED DESCRIPTION OF THE PREFERRED EMBODIMENTS

Figure 1:
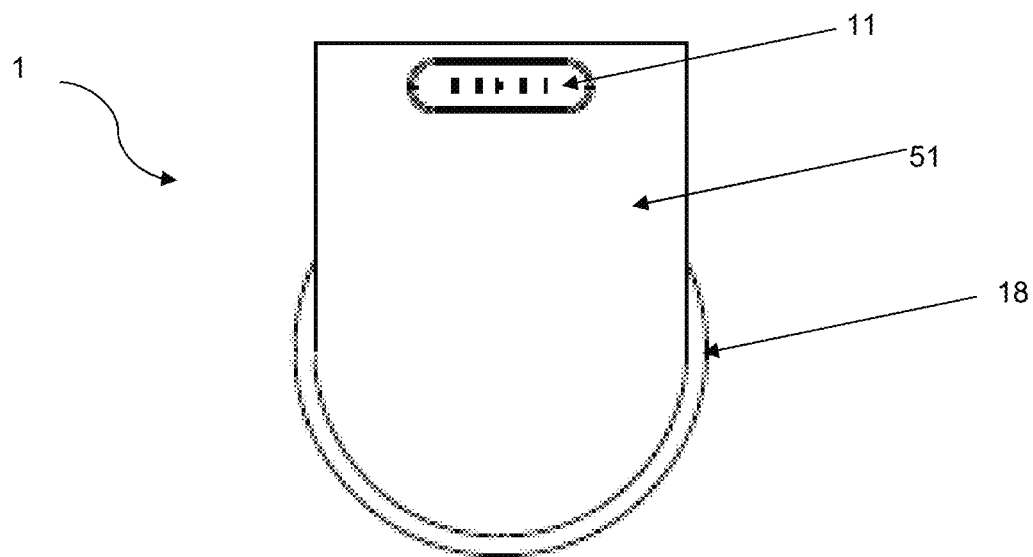
FIG. 1 a top view of an electric motor with a controller according to a preferred embodiment of the present invention.
Figure 2:
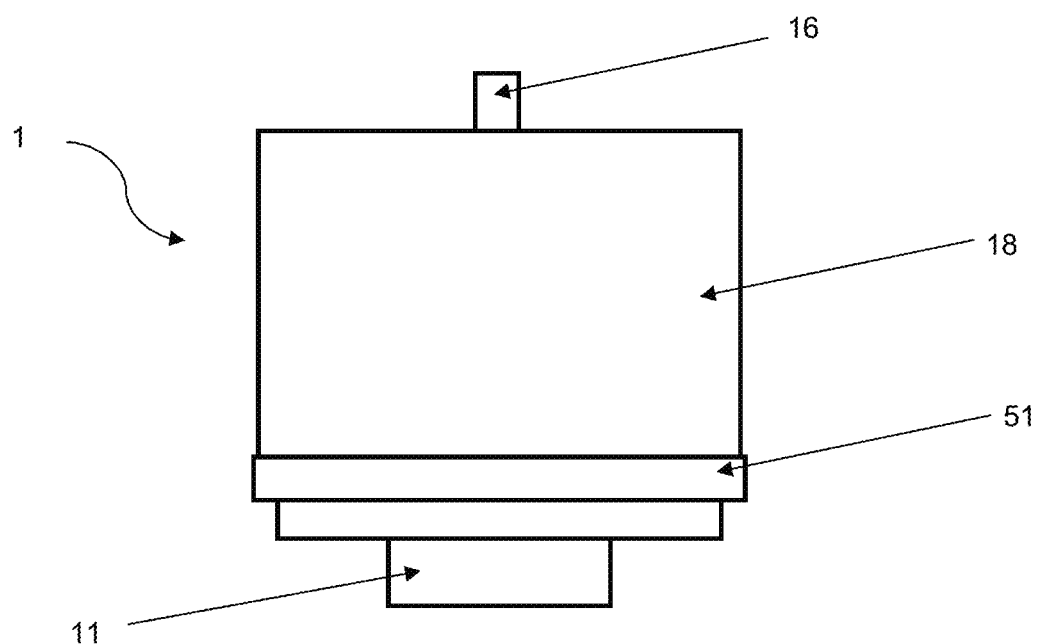
FIG. 2 a side view of an electric motor with a controller according to a preferred embodiment of the present invention.
Figure 3:
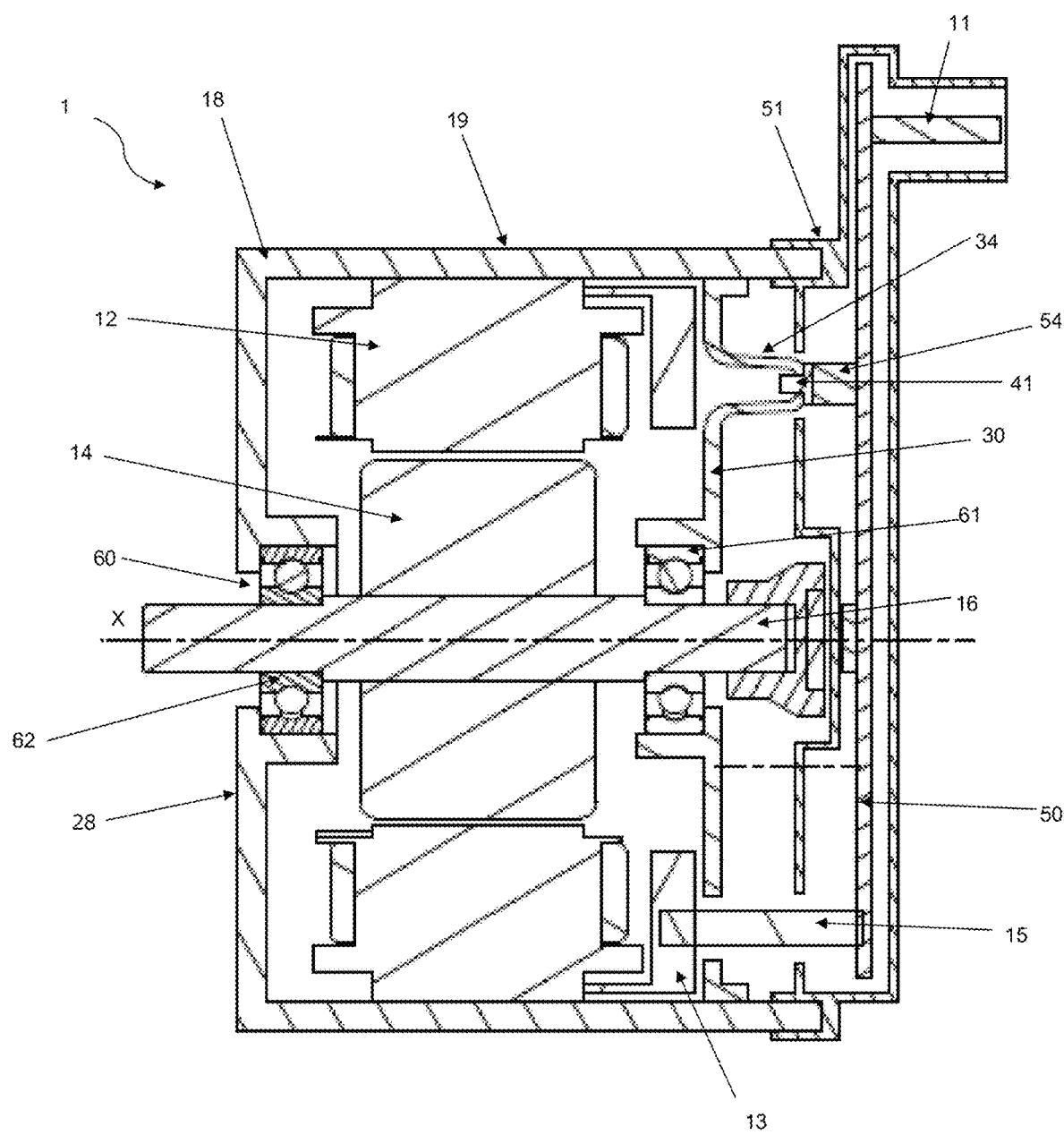
FIG. 3 a sectional view of an electric motor with a controller according to a preferred embodiment of the present invention.

FIG. 1 is a top view of an electric motor 1 with a controller case 51; FIG. 2 shows a side view of the motor 1 with the controller case 51 and FIG. 3 shows a sectional view of the motor 1 with the controller case 51.

The electric motor 1 comprises a stator assembly 12, a rotor assembly 14 with a shaft 16, and a housing 18. The rotor assembly 14 rotates about a vertical center axis X, which is preferably formed by the shaft 16. The stator assembly 12 is disposed around the rotor assembly 14 and is fixed inside the housing 18. A bearing mechanism 60 is provided to rotatably support the rotor assembly 14 relative to the stator assembly 12. The housing 18 comprises a cylindrical wall portion 19 with a bottom 28 and a cover plate 30, which covers an opening of the cylindrical wall portion 19. The cover plate 30 is disposed at an axial end of the housing 18 opposite to the bottom 28.

A controller 50 is provided to drive and control the electric motor 1. The controller 50 is covered by a controller case 51, which covers at least a part of the controller 50. The controller 50 is disposed on the upper side of the cover plate 30, wherein the cover plate 30 is made of electrically conductive elements in particular made from conductive material.

The cover plate 30 also comprises at least one projection 34, projecting towards the upper outer side of the cover plate 30. The at least one projection 34 can directly or indirectly contact at least one grounding contact 54 of the controller 50. The at least one projection 34 can indirectly contact the at least one grounding contact 54 of the controller 50 via at least one electrically conductive element 41. Hence, the controller 50 can be connected to a ground potential through the cover plate 30 and then the motor housing 18. The at least one grounding contact 54 of the controller 50 may also be protruding from the controller 50 and approach the at least one projection 34.

The stator assembly 12 is electrically connected to a busbar 13. The busbar 13 can be an assembly of plural wirings so as to carry electricity to each segment of stator assembly 12. Moreover, the busbar 13 is connected to at least one terminal 15 and electrically connected to the controller 50 and ultimately a power supply (not shown) via a connector 11. Therefore, electricity is carried to the stator assembly 12 according to the control of the controller 50.

Figure 4:
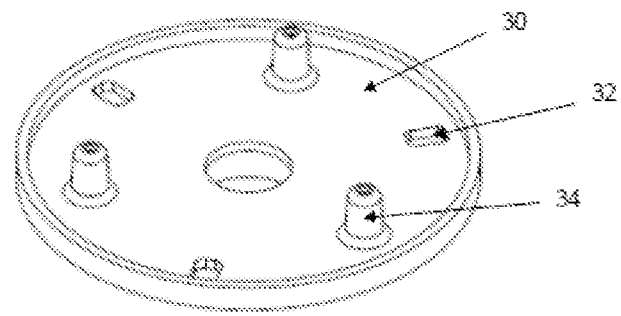
FIG. 4 a view of a cover plate according to a preferred embodiment of the present invention.

FIG. 4 shows a view of the cover plate 30. In this embodiment, the cover plate 30 has three projections 34 protruding toward the upper outer side of the cover plate 30 and are disposed at the equal distance from each other in the circumferential direction of the cover plate 30.

Figure 5:
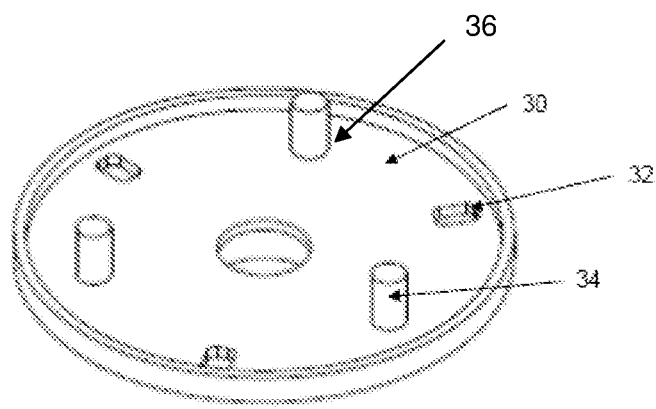
FIGS. 5 and 5A are views of a cover plate according to a preferred embodiment of another embodiment of the present invention.
Figure 5A:
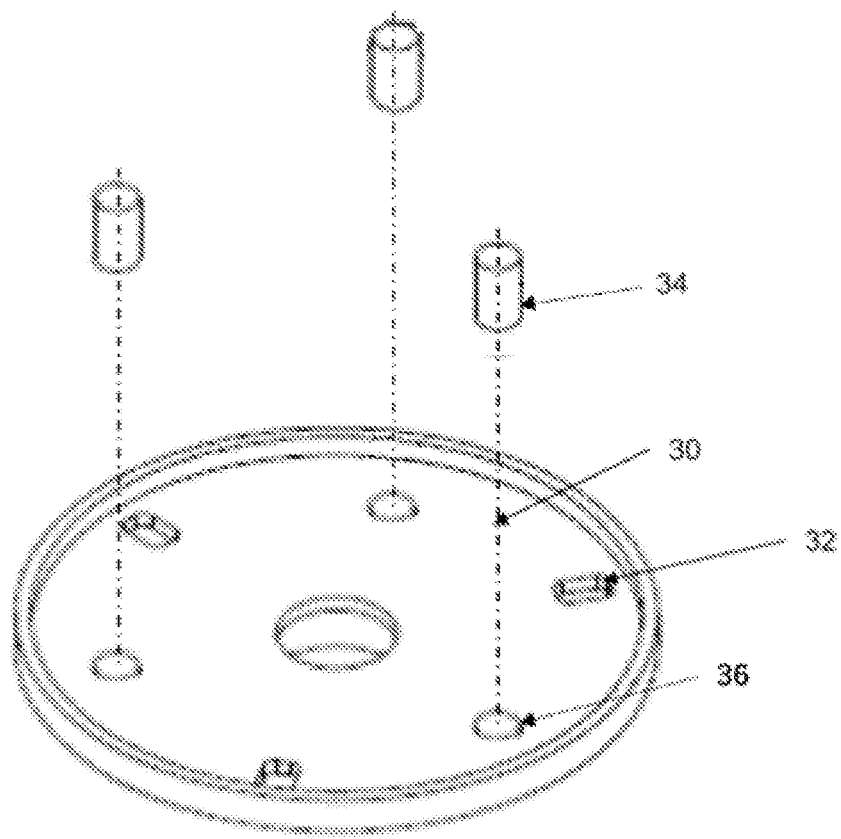

In this case, three projections are protruded by deep drawing from the cover plate 30 and are formed to be a cup-shape. And at least one of three projections 34 are configured to, directly or indirectly, contact at least one grounding contact 54 of the controller 50 so that the controller 50 can be connected to a ground potential through the cover plate 30 and then the motor housing 18. All of the three projections can contact the corresponding three grounding contacts 54 of the controller 50 and one or two of the three projections 34 can also contact the corresponding one or two grounding contact(s) 54 of the controller 50, respectively. Because these three projections 34 are made from one cover plate 30 and do not need additional parts for grounding, this invention can achieves inexpensive grounding manner. However those three projections 34 are not necessarily formed as a cup-shape and can be achieved by other manners or additional separate inserted parts to the cover plate 30 (FIGS. 5 and 5A shows pins (e.g., the projections 34) inserted into insertion holes 36). Furthermore, at least one of the projections 34 may be provided with coating comprising a material improving the electrical conductance.

Moreover, those three projections 34 can also be achieved by the manner in which the projections 34 are cut out and raised up outwardly from the cover plate 30. In case those projections 34 are raised up outwardly in the axial direction of the vertical center axis X, the distant projections in the axial direction can be achieved. However, it is not always necessary that those three projections 34 extend in the axial direction. These cut-out and raised-up projections can be formed from the cover plate 30 and can achieve inexpensive grounding manner and those projections 34 can also act as a leaf spring and achieve a good contact position, irrespective of the tolerances of the cover plate 30 and the controller 50 (FIG. 7).

Furthermore, the cover plate 30 has three holes 32 arranged at the equal distance from each other in the circumferential direction of the cover plate 30 between the adjacent two projections 34. In this embodiment, through these three holes 32, the terminals 15 can pass the cover plate 30 from the side of the busbar 13 to the side of the controller 50 and can carry electricity from the power supply to the stator assembly 12. Moreover, when the electric motor 1 is a three phase motor, such motor 1 usually has three wirings (u-phase, v-phase and w-phase) and to carry electricity to these three wirings three terminals are optimum.

The cover plate 30 can also has at least one positioning hole (not shown) where the relative position of the controller case 50 can be defined through said at least one positioning hole.

Figure 6:
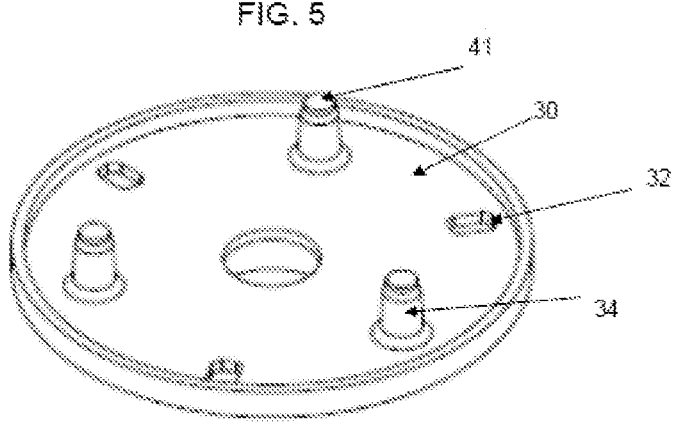
FIG. 6 a view of a cover plate with electrically conductive elements on projections according to a preferred embodiment of the present invention.
Figure 7:
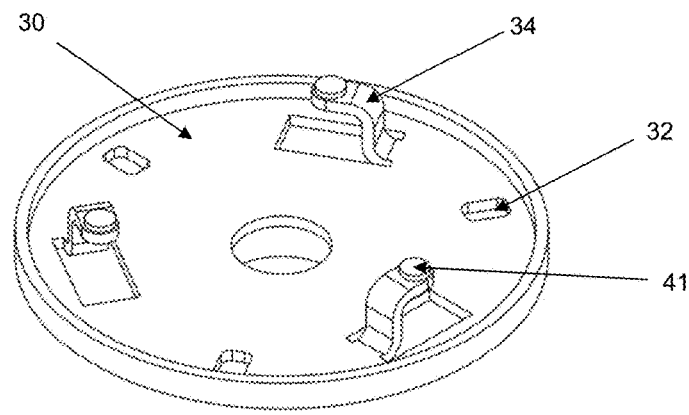
FIG. 7 a view of a cover plate with electrically conductive elements on projections according to a preferred embodiment of another embodiment of the present invention.

FIG. 6 shows the cover plate 30 with electrically conductive elements 41 on cup-shaped projections 34 and FIG. 7 shows the cover plate 30 with electrically conductive elements 41 on cut-out and raised-up projections 34.

At least one electrically conductive element 41 can be disposed on the top of the projections 34 as shown in FIG. 6 and FIG. 7. This can achieve more secure grounding, because this allows using more electrically-conductive elements than the cover plate 30 and can securely escape the electric noise toward the cover plate 30 and then the motor housing 18. Moreover, this can be also used as an adjustment of the distance between the projections 34 and the grounding contacts 54 of the controller 50. Therefore, even in the case there is a long distance between the projections 34 and the grounding contacts 54 of the controller 50, at least one electrically conductive element 41 can connect the projections 34 and the grounding contacts 54 of the controller 50. The at least one electrically conductive element 41 is not necessarily one element but can be comprised of plural elements.

The at least one electrically conductive element 41 can be made of elastic material, which enables a stable contact between the electrically conductive element 41 and the grounding contact 54 of the controller 50, thereby guaranteeing the grounding of the controller 50. Moreover, the at least one electrically conductive element 41 can also be coated by corrosion proof material so as to avoid the at least one electrically conductive element 41 from corrosion for a long period.

As can be seen in FIG. 3 the bearing mechanism 60 comprises at least two bearings, an upper bearing 61 being sustained by the cover plate 30 and a lower bearing 62 sustained by the bottom 28 of the housing 18.

Figure 8A:
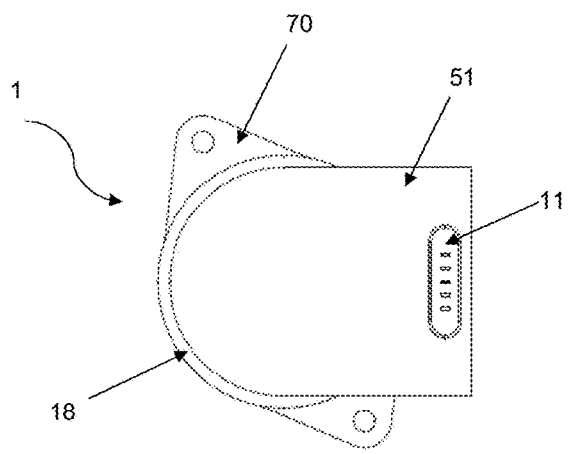
Figure 8B:
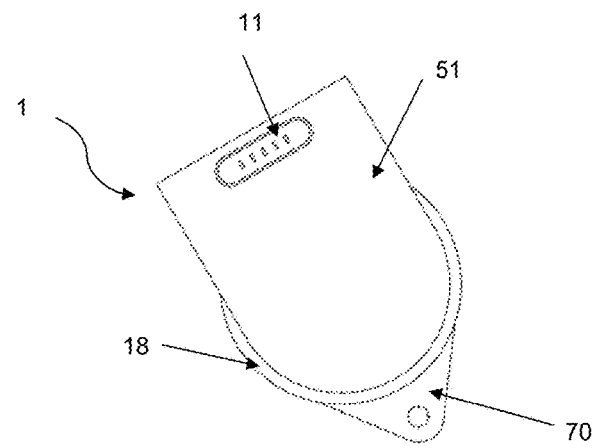
Figure 8C:
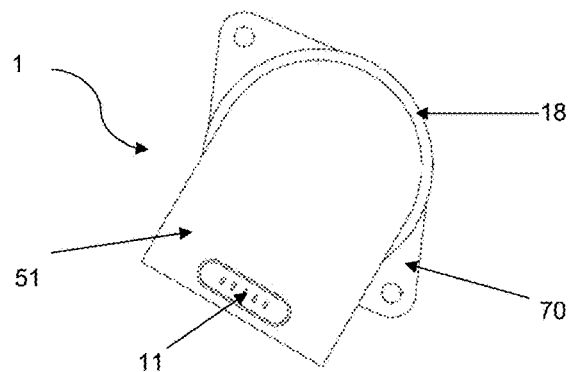

FIGS. 8A, 8B and 8C show the top views of the electric motor 1 with the controller 50 which achieves the flexible positioning of the controller case 51.

In this embodiment, a mounting plate 70 is affixed to the housing 18. Because the terminals are arranged at the equal distance from each other and three protrusions are also arranged at the equal distance from each other, the controller 50 can be positioned and connected to the terminals 15 for every 120 degree. Therefore, in case the controller case 51 is longitudinal and protrude from the motor housing 18. The flexibility of the configuration of the electric motor 1 with the controller 50 can be achieved, as shown in the FIGS. 8A, 8B, and 8C.

This can achieve flexible arrangements of the electric motor 1 with the controller 50 in the limited space of a car body. In particular, when the controller case 51 has a longitudinal shape and protrudes in an radial direction from the motor housing 18, the arrangement manner in the car body is more limited, because other automotive devices and components such as engines, transmissions, chassis, steerings and brakes etc. are occupying the car body and the space and its configuration for motors are limited. This invention can achieve certain flexible positioning of the controller and the electric motor 1 with the controller 50 can be placed according to the space for the electric motor 1.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. An electric motor, comprising:
a rotor assembly, which rotates about a vertical center axis extending in a vertical direction;
a stator assembly, which is provided around the rotor assembly;
terminals, which are connected electrically to the stator assembly;
a housing inside of which the stator assembly is fixed; and
a bearing mechanism, which rotatably supports the rotor assembly relative to the stator assembly; wherein
the housing includes:
a cylindrical wall portion, the stator assembly being located inside of the cylindrical wall portion;
a bottom which is provided at a bottom vertical end of the cylindrical wall portion and which extends radially outward; and
a cover plate which is on one side of the stator assembly that is opposite to the bottom; wherein
the cover plate is fixed to a radially inner side surface of the cylindrical wall portion and covers an opening of the cylindrical wall portion;
the bearing mechanism includes at least two bearings, one of the at least two bearings is supported by the cover plate and another one of the at least two bearings is supported by the bottom of the housing;
the cover plate includes electrically conductive elements and columnar projections fixed on the cover plate and protruding away from the stator assembly so that the columnar projections each directly or indirectly contact respective ones of grounding contacts of a controller which drives and controls the electric motor on one side of the cover plate, the controller being electrically connected to a ground potential through the housing;
the cover plate includes terminal holes, each of the terminal holes passing through one of the terminals;
at least one of the terminal holes is arranged between two adjacent projections of the projections;
the columnar projections include a pin which is inserted and fixed in an insertion hole of the cover plate; and
a shape of the terminal holes is different from a shape of the insertion hole into which the pin is fixed when viewed in the vertical direction.

2. An electric motor according to claim 1, wherein the insertion hole penetrates into the cover plate in the vertical direction.

3. An electric motor according to claim 1, wherein a radial length of the terminal holes is longer than a circumferential length of the terminal holes.

4. An electric motor according to claim 1, wherein the columnar projections are coated with a material which improves electrical conductance.

5. An electric motor according to claim 3, wherein the cover plate includes three of the columnar projections arranged at equal distances from each other in a circumferential direction and three of the terminal holes arranged at equal distances from each other in the circumferential direction.

6. An electric motor according to claim 5, wherein the housing includes a mounting plate to fix the electric motor to a car body.

7. An electric motor according to claim 6, wherein the mounting plate includes two mounting holes.

8. An electric motor according to claim 7, wherein the two mounting holes are positioned at equal distances from the vertical center axis.

9. An electric motor according to claim 7, wherein
a first straight line passes through the two mounting holes and the vertical center axis;
a second straight line passes through a center of a connector of the electric motor and the vertical center axis; and
the first straight line and the second straight line intersect one another with an angle between the first straight line and the second straight line being 0 degrees.

10. An electric motor according to claim 7, wherein
a first straight line passes through the two mounting holes and the vertical center axis;
a second straight line passes through a center of a connector of the electric motor and the vertical center axis; and
the first straight line and the second straight line intersect one another with an angle between the first straight line and the second straight line being 60 degrees.

11. An electric motor assembly, comprising:
the electric motor according to claim 1;
a controller which drives and controls the motor;
a controller case which covers at least a portion of the controller; wherein
the controller is on the one side of the cover plate and the at least one columnar projection directly or indirectly contacts at least one grounding contact of the controller and the controller is connected to a ground potential through the housing.

12. An electric motor assembly according to claim 11, wherein
the mounting plate includes two mounting holes;
a first straight line passes through the two mounting holes and the vertical center axis;
a second straight line passes through a center of the connector and the vertical center axis; and
the first straight line and the second straight line intersect one another with an angle between the first straight line and the second straight line being 0 degrees.

13. An electric motor assembly according to claim 11, wherein
the mounting plate includes two mounting holes;
a first straight line passes through the two mounting holes and the vertical center axis;
a second straight line passes through a center of the connector and the vertical center axis; and
the first straight line and the second straight line intersect one another with an angle between the first straight line and the second straight line being 60 degrees.

* * * * *